April 13, 1937. T. A. BOWERS 2,076,544
PISTON RING
Filed Dec. 12, 1935 2 Sheets-Sheet 2
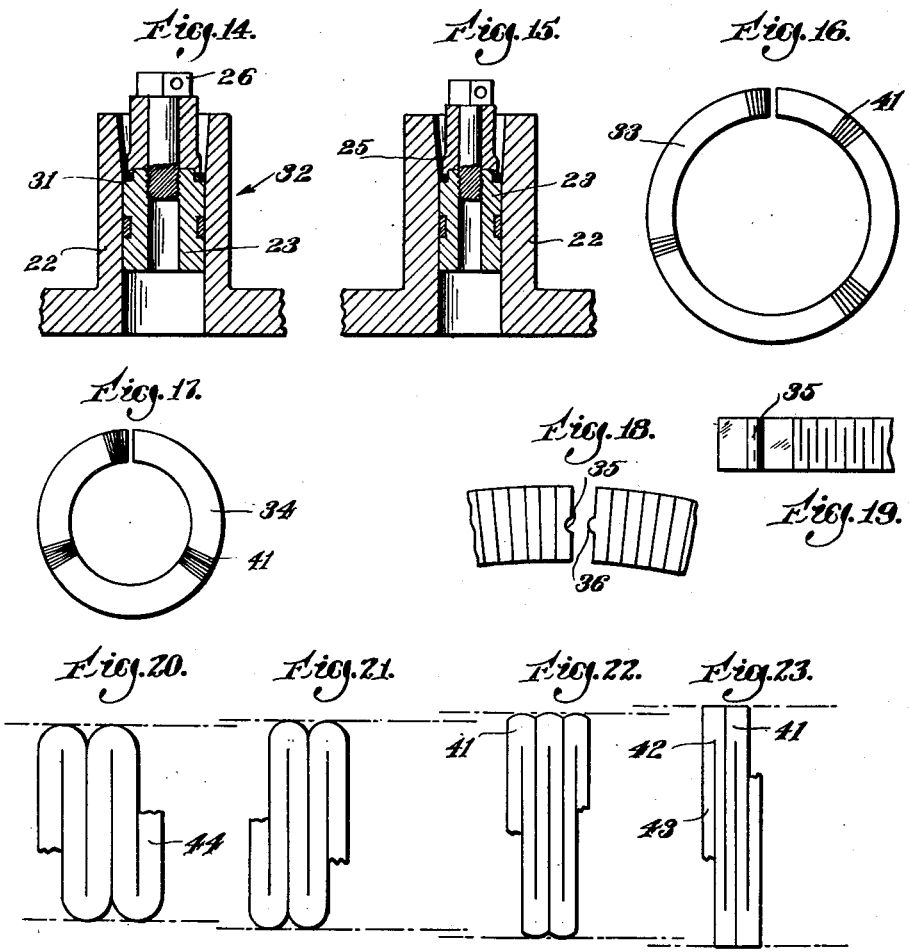
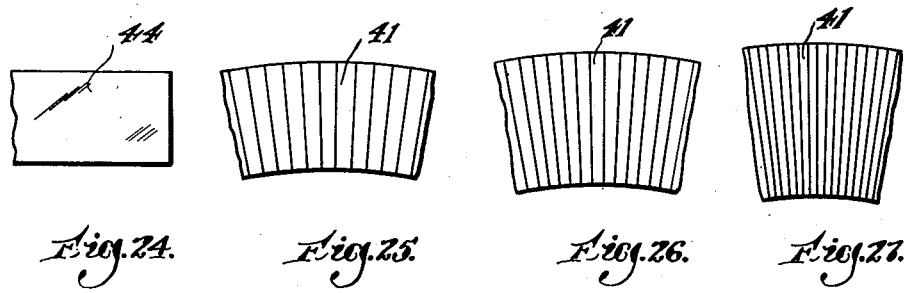
Inventor
Thomas A. Bowers
by Munroe L. Hamilton
Attorney Patented Apr. 13, 1937

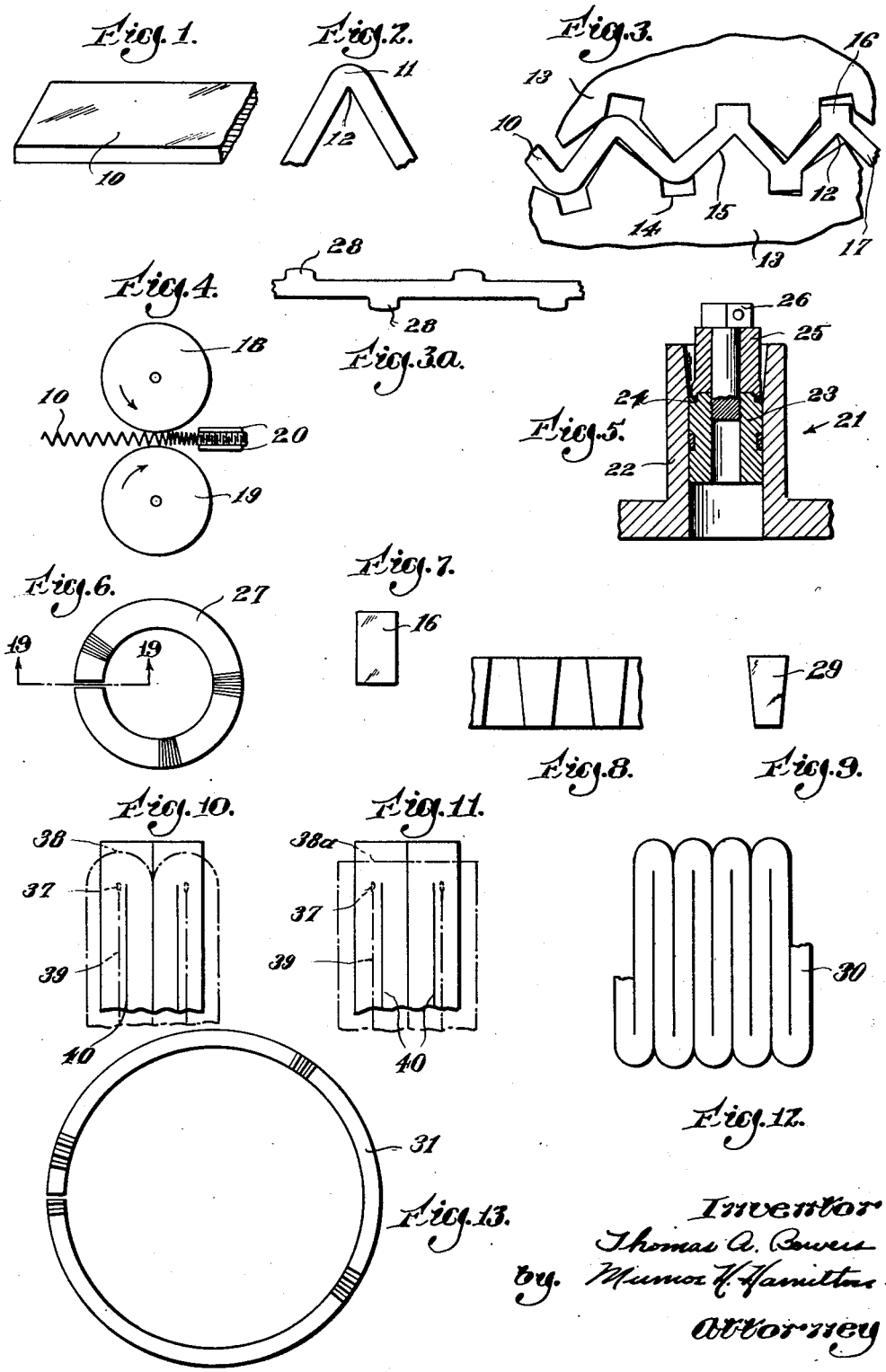

2,076,544

UNITED STATES PATENT OFFICE 2,076,544

PISTON RING

Thomas A. Bowers, Boston, Mass., assignor to Flexion, Inc., Boston, Mass., a corporation of Massachusetts Application December 12, 1935, Serial No. 54,153

10 Claims. (Cl. 309—29)

My present invention relates to packing and more particularly to piston packing rings fabricated from a ribbon or sheet material.

All attempts in the art, so far as I am aware, to fabricate a flexible piston packing ring from ribbon material have failed to provide adequate strength characteristics. This has resulted in the breaking down under practical working conditions of rings made from fabricated ribbon material and in the failure of such ring to compare even favorably with the C type cast iron piston ring now generally used.

I have discovered that the cause of such breaking down may be directly traced to certain common points of structural weakness in these prior rings and the present invention discloses novel structure and means for definitely overcoming the ring failure as well as providing a better seal and longer life ring. This application is a continuation in part of my co-pending applications, Serial Numbers 34,193, filed August 1, 1935, 21,183, filed May 13, 1935, 733,472, filed July 2, 1934, and 733,243, filed June 30, 1934.

The principal object of my invention is therefore an improved packing ring.

Another object of my invention is a flexible piston ring fabricated from a ribbon material.

Another object is a flexible piston ring fabricated from a metal ribbon having preformed crown characteristics.

Another object of my invention is a piston ring of the character described which is provided with certain strengthened portions to avoid breaking.

Still another object is the elimination of compression loss by increasing the width of the fabricated ring and the avoidance of a ring gap by locking the ends thereof.

Other objects and novel features comprising the construction and operation of my invention will appear as the description of the same progresses.

In the drawings illustrating the preferred embodiment of my invention,

Fig. 1 illustrates a length of ribbon material utilized in the production of my improved packing ring.

Fig. 2 is a view showing in side elevation a length of the material reversely folded as the first step in the treatment thereof.

Fig. 3 is another side elevation showing the material passing through a further forging step.

Fig. 3a is a side elevation of a modification of a preformed material.

Fig. 4 is a plan view diagrammatically indicating a closing step in which a pair of rolls frictionally close the material against a resistance.

Fig. 5 is a view showing in cross section a tapered die with a ring of material inserted therein.

Fig. 6 is a plan view of a finished ring as it appears after leaving the step illustrated in Fig. 5.

Fig. 7 is a detailed plan view of a segment of the material shown at the right hand side of Fig. 3, more particularly illustrating the rectangular crown formation.

Fig. 8 is another detailed plan view of a material similar to that shown at the right hand side of Fig. 3, with the further modification of key-stone shaped crowns.

Fig. 9 is a detailed plan view of a crown similar to those shown in Fig. 8.

Fig. 10 is a fragmentary side elevation in dot and dash lines, of reversely folded material in a compacted state upon which has been superimposed in full lines a similar view of the compacted preformed material.

Fig. 11 is a view similar to Fig. 10, and further showing both types of material with flat crowns.

Fig. 12 is another side elevation of reversely folded ribbon material.

Fig. 13 is a plan view showing a ring of material formed from material similar to that illustrated in Fig. 12.

Fig. 14 is a view showing in cross section a tapered die with the ring illustrated in Fig. 13, inserted therein.

Fig. 15 is a view similar to Fig. 14 and illustrating a succeeding step with a smaller die.

Fig. 16 is a plan view of a ring partly formed by die steps as illustrated in Figs. 14 and 15.

Fig. 17 is a plan view of a finished ring made from a plurality of die steps as indicated in Figs. 14 and 15.

Fig. 18 is a detail plan view, greatly exaggerated of one form of the ends of the ring illustrated in Fig. 17.

Fig. 19 is an elevation view taken on the line 19—19 of Fig. 6.

Fig. 20 is a view showing in side elevation a length of reversely bent material.

Fig. 21 is a view similar to Fig. 20 and illustrating the material after having been passed through the die step indicated in Fig. 14.

Fig. 22 is a view similar to Fig. 21 and is illustrative of the material after it passes through a further die step.

Fig. 23 is a view in side elevation of a fragment of a finished ring.

Fig. 24 is a plan view of a length of the ribbon material.

Fig. 25 is a view similar to Fig. 24, showing the material reversely folded together.

Fig. 26 is a view similar to Fig. 25, illustrating the material in a partly formed state.

Fig. 27 is a similar view showing fragment of a finally completed ring.

Referring more in detail to the drawings, it will be noted that Figs. 1-6 inclusive, illustrate various steps in the manufacture of a completed piston ring. It should also be noted that Figs. 12-17 inclusive, set forth a second mode of procedure whereby a ring of essentially the same proportions is produced. In describing the ring, reference will first be had to the modification illustrated in Figs. 1-6 inclusive, but it should be understood that that modification illustrated in Figs. 12-27 is a preferred embodiment of my invention.

10 indicates a length of ribbon material from which my improved piston ring is fabricated. I may make use of any suitable material in either ribbon or sheet form, although I prefer to use a steel ribbon which may be of varying thickness and width.

In the production of a fabricated ring of this nature, the number of interstices occurring for a given diameter ring is important as it has been found that with an increase in the number of interstices, the characteristics of the ring are improved. A ribbon stock of .020 inch thickness may be used to increase the number of interstices and I have found that a ribbon thickness of .015 and .010 inch may also be advantageously utilized. A ribbon stock keystone shaped in cross section may also be used.

The ribbon 10 is reversely folded as illustrated in Fig. 2 with the formation of bends 11 and the inner sides of the bends are formed with a sharp V edge 12. When the material is later compacted the provision of the V edge eliminates the occurrence of loops which would cause incomplete compacting of the material upon itself.

Fig. 3 illustrates the material 10 being passed through a forging step in which forging dies 13, 13 have been fragmentarily shown. The dies comprise suitably shaped openings 14 alternately occurring with V-shaped portions 15. When one of the openings 14 is in a dead center position with respect to an opposite V shaped portion 15, the distance between the sides of the opposed V shaped members is less than the thickness of the ribbon stock whereby metal is flowed forming a structure as shown emerging at the right hand side of Fig. 3. This structure is made of crown portions 16 and thinned web portions 17.

In a further step, Fig. 4 indicates diagrammatically a pair of friction wheels 18 and 19 which are adjusted so that they will grip a length of the material illustrated at the right hand side of Fig. 3 and compact it against a resistance. The friction wheels may grip the material at the alternately occurring crowns 16 or at the edges, the former being preferable. The resistance may comprise any suitable holding mechanism and in the present instance I have employed a pair of opposed presser feet 20, which pass the material only after it has become firmly compacted upon itself. The material is partly supported by channel base not shown and the presser feet 20 are laterally adjustable at either side of this channel base to give the desired amount of gripping force on the material.

In Fig. 5, I have shown in cross section, a die generally indicated by the numeral 21 which comprises an annular tapered sleeve portion 22, in which is slidably located a core 23 which is provided at its top surface with means for receiving a ring of material 24. Upon the ring 24, and adjacent the core 23, is locked a punch member 25 by means of a threaded bolt 26. The action of the die is to pass the ring through a decreasing diameter whereby the ring is circumferentially reduced to a given ring size with the web portions thereof, becoming thinned. It is not intended to adhere strictly to the exact die design here illustrated, as it may be desirable to secure and treat the ring in several different ways. However, the use of the tapered sleeve is advantageous as by this means the ring is circumferentially compressed to a proper size, a hardening action is effected, and the ring is finished and polished to produce the final product 27 shown in Fig. 6.

With regard to the method just discussed, it is possible to perform certain modified steps which will result in a piston ring material similar to that illustrated at the right hand side of Fig. 3, whereby the new thick crown and thin web structure is obtained. Fig. 3a illustrates a material formed by such a modification. In this case the material is formed either in a curved or straight state with crown portions 28 alternately occurring on opposite sides of the ribbon stock. Such a material may be reversely bent at points midway of each crown portion 28 and will comprise a material essentially similar to that shown at the right hand side of Fig. 3.

As previously stated the material may be formed either in a curved or straight state. If it is the former, a pair of rotary dies, of a conventional nature and not illustrated in the drawings, will be utilized. If the latter form is made, conventional reciprocating dies will be adequate.

In the case of these various forging steps which provide the relatively thick crown and relatively thin web intermediate product, I may also desire to form the material in sheets rather than in ribbon form with strips of the formed material later being cut therefrom as found necessary. It is intended, however, that treatment of the ribbon stock and the resulting ring shall be illustrative of such procedure and any ensuing product of a packing nature.

Fig. 7 illustrates in plan view one of the crowns 16 of the material shown in Fig. 3, indicating the rectangular formation. Another modification which may be had in the formation of this material is by using forging dies similar to those illustrated in Fig. 3, which are further keystone shaped to effect a crown and web construction which has a wedge shaped formation in plan view or keystoned as I prefer to call it and as I have illustrated in Figs. 8 and 9 by crown 29. The advantage here is in the fact that such a material will tend to compact circularly and hence there need be less flowing and less work to be done by the tapered die.

Another method and resulting ring will now be described as the preferred embodiment of my invention, although certain basic characteristics of the two rings are similar and will be later discussed in detail.

In Fig. 12 there has been indicated a length of reversely bent material 30, formed in a similar manner to that illustrated in Figs. 1 and 2 and compacted for example by the method shown in Fig. 4. A ring of this material is formed as illustrated by ring 31 in Fig. 13 and is placed in a die generally denoted by the numeral 32 in Fig. 14, which die is of a similar construction to the die illustrated in Fig. 5 and already described. The diameter of the ring 31 is considerably greater than that of the ring used in die 21. For the present process, to make a finished ring of 3⅛ inches diameter, initial ring 31 may have a diameter of approximately 7½ inches. This ring will then pass through a series of dies of successively decreasing diameter. Figs. 14 and 15 are intended to be illustrative of a number of such steps. For example a very satisfactory result may be obtained by using twenty of these dies. Under this treatment the ring becomes decreased in diameter and increased in width as illustrated in Fig. 16 by ring 33. A final ring 34 is produced as illustrated in Fig. 17, which has the same thick crown and thin web construction as a result of circumferential reduction of the ring.

I also may desire to provide a lock for the ends of the ring and when this is done there will be an additional step taking place just before ring 31 is placed in die 32, which consists of cutting or impressing a slot, preferably vertical and which may be in various forms, in one or the other of the ends of the ring. By the action of the dies, metal will be flowed into the conformation of the slot from the opposite ring end and will comprise an integral key portion in the said ends. This construction is illustrated in Figs. 18 and 19 in which is shown a slot 35 and a key portion 36, which locks the ends of the rings together, preventing radial displacement of one end of the ring with respect to the other. Vertical displacement is of course prevented by the ring groove in which the ring is located or may be similarly provided against by the conformation of the slot and key. Another final step may also be sighted which is of a rather optional nature whereby certain flashing or grinding operations may be formed to give the ring a smoother polish and finish. Such steps have not been illustrated as a conventional grinding apparatus is employed when this is done. The grinding will take place at the top and bottom sides of the ring where some roughness may occur and as an example of one means, the ring may be placed against the flat side of a grindstone and then reversed, with the other side of the ring applied to the grindstone.

There are several important characteristics of my improved ring which may be pointed out. The first and most important of these is the thick crown and thin web construction and this is present whether the ring be made by the forging methods or by the multiple die method. In Fig. 3, I have illustrated a forging step resulting in the formation of crowns and connecting web portions. It should be noted that the vertical distance from the sharp V edge 12 to the top of the crown 16, is greater than the thickness of an adjoining web portion. The actual relation is better illustrated in Figs. 10 and 11, in which the distance between the point of bending 37, and the top of the bend 38, is contrasted in broken lines with the full line showing of the preformed crowns compacted together, and again in Fig. 11 there has been contrasted the same dimension after the bends have been flattened as compared with the forged material. The significance of this construction becomes more apparent when it is understood that the whole ring, in use, is constantly moving radially, and such flexing must take place at the bends or in the webs.

As long as these webs are thinner than the bends or crowns, flexing will take place in the webs, but if the crowns are smaller than the particular dimensions referred to, flexing in the crown occurs, which ultimately results in the crowns breaking and failure of the ring. It should also be noted in Figs. 10 and 11, that as the webs have been thinned, the interstices have moved closer together, which means that for a given diameter of ring more interstices may occur.

In connection with these crowned and web portions, I have diagrammatically indicated in Figs. 20–23 inclusive the development of the reversely bent material through the several die steps, in which it will again be noted, that the vertical dimension from the top of the crown 41 to the tip of its interstice 42, is similarly greater than the thickness of a web 43, with the webs having become much thinner than the original ribbon stock 44, and the total vertical height of the ring has increased while a greater number of interstices is present per unit length.

It will be seen in Figs. 13, 16, and 17, that the circumference of the initial ring 31 becomes materially reduced as compared with ring 34. Attention is also directed to the increase in the radial width of the ring. This is an important feature of these flexible piston rings. The desirability of broad piston rings has long been understood, but there are certain difficulties in incorporating this feature in cast iron rings, such as assembly on a piston and the occurrence of sticking. The flexibility of my ring obviates any question of difficulty in assembly, whereas the cast iron ring is limited to the radial thickness which can be successfully sprung over the head of a piston without distortion occurring.

If a broad cast iron ring, in sections, is used such broadness tends to create sticking of the ring with failure of the seal. As my flexible ring is installed in a piston in a circumferentially compressed state, there will always be present a certain amount of flexing. However the amount of this flexing force may, it is found, be increased with an increase in the number of interstices and also by imparting further springiness to the metal in its reversely bent state by the plurality of die treatments. By making use of these two factors, there is obtained ample flexing action to prevent sticking from broadness of the ring and it is possible to make a seal with one ring which will take the place of and be superior to several cast iron rings.

Figs. 24–27 inclusive illustrate in plan detail the forming of a flat ribbon into a structure having crowns 41 which are wider than the ribbon stock 44 and vertically greater than the height of the original bends therein.

The use of the broad ring necessitates a deeper piston groove and this provides a better seal, since "blow-by" must pass a greater distance around in back of the ring. The wall pressure exerted by my ring is considerably more uniform than can be obtained by a cast iron seal as has been proven by extensive gas meter tests both in the cylinders of a car in operation and in test cylinders. With the elimination of most "blow-by" through the gap at the ends of the ring, a common source of "blow-by", and which is adequately stopped or taken care of by my locked end arrangement, an outstandingly better seal results.

Another characteristic of the ring already mentioned is the increased springiness of the crown and web structure when formed by the multiple die operations. The action of the dies tends to impart hardness and may avoid a specific hardening step.

In summation the following ring characteristics appear: greater vertical crown thickness in relation to the thickness of the webs, overcoming breaking of the ring; greater radial width providing a broad ring and practically eliminating "blow-by"; an increased number of interstices for any given diameter ring providing greatly increased uniformity of wall pressure; pronounced springiness in the metal not before obtained and greatly increasing the flexing characteristics of the ring; locked end construction eliminating gap "blow-by"; and a number of commercial considerations such as the production of a steel ring, simplicity of manufacture and lower cost of production, generally longer life, more perfect and steadily maintained seal, elimination or solving of out-of-round cylinder conditions and simplified installation.

I have indicated several modes of procedure which result in a substantially similar ring structure in each instance and these various methods are thought to be representative and the equivalent of all means of producing my new crown and web construction in a piston ring material.

It is to be understood therefore that my new construction may be embodied in any form of packing, and any suitable material, in either ribbon or sheet form may be used in keeping with the spirit of my invention.

Having thus described my invention, what I claim is:

1. A substantially solid piston ring comprising a single piece of reversely bent metal ribbon presenting flat crown portions and connecting web portions, said crown portions being of a minimum vertical thickness at least equal to the minimum thickness of an adjacent connecting web portion in a direction circumferentially of the ring.

2. A substantially solid piston ring formed from a single piece of reversely bent piston ring material, said ring having crown portions and connecting web portions, said crown portions being composed in part of material flowed into the crown portions from adjacent connecting web portions whereby the vertical thickness of the crowns in the finished ring is equal to or greater than than thickness of adjacent web portions in a direction circumferentially of the ring.

3. A substantially solid piston ring formed from a single piece of reversely bent strip of piston ring material, said ring presenting flat crown portions and connecting web portions, the vertical thickness of the crown portions being at least equal to the circumferential thickness of adjacent connecting web portions, the width of said ring being greater than the original width of the strip from which said ring was formed.

4. A substantially solid piston ring comprising a single piece of reversely bent metal ribbon presenting flat crown portions and connecting web portions, the width of said portions considered radially of said ring being greater than the original width of the metal ribbon from which said ring was formed, and the radial width in said ring being greater than the vertical thickness thereof.

5. A substantially solid piston ring formed from a single piece of oversize ring of reversely bent piston ring material, said piston ring having crown portions and connecting web portions, said oversize ring, as circumferentially reduced, having increased occurrence of crown and web portions per unit length, said crown portions having a minimum vertical thickness equal to or greater than the thickness of an adjacent web portion in a direction circumferentially of the finished ring.

6. A piston ring comprising a reversely bent ribbon presenting crown portions and connecting web portions, said crown portions having a vertical thickness from the tip of an interstice to the top of a related crown greater than the thickness of an adjacent web portion measured circumferentially, and means locking the ends of said ring when installed in a piston.

7. A flexible packing ring for pistons and the like comprising a multiplicity of corrugations fabricated from a metal ribbon and presenting crown and web portions, the said crowns having a vertical thickness greater than one of the said related web portions measured circumferentially, the said webs being laterally compressed to substantially compact the entire length of the interstices therein, one of the ends of the said ring having a recessed portion and the other end having a key portion adapted to engage in said recessed portion and comprise a lock when said ring is closed.

8. A flexible packing ring for pistons and the like comprising a multiplicity of compressed corrugations fabricated from a metal ribbon having crown and web portions, both said portions being preserved in the finished ring, the said crowns of the ring having a vertical thickness equal to or greater than one of said related web portions measured circumferentially, the said webs being laterally compressed to substantially compact the entire length of the interstices therein.

9. A flexible packing ring for pistons and the like comprising a multiplicity of closely compressed corrugations fabricated from a metal ribbon keystone shaped in cross section having crown and web portions preserved in the finished ring, the said crowns having a vertical thickness greater than one of the said related web portions measured circumferentially and said web portions being substantially perpendicularly disposed in said ring.

10. A flexible packing ring for pistons and the like comprising a multiplicity of alternately closely compressed corrugations fabricated from a piston ring material having crown and web portions preserved in the finished ring, each of said crown portions having a lateral thickness in at least one portion thereof substantially equal to the sum of the thicknesses of the two related web portions measured circumferentially at any point therein and the said crown also having a vertical thickness greater than one of the said related web portions, the said webs being laterally compressed to substantially close the entire length of the interstices therein.

THOMAS A. BOWERS.